United States Patent Office

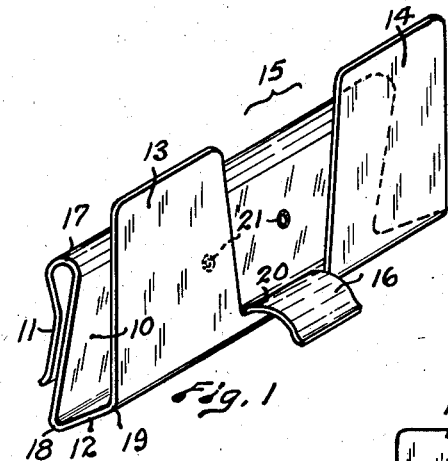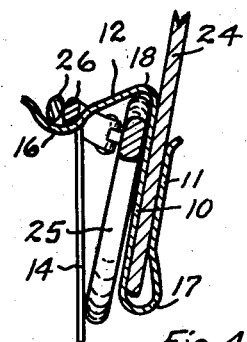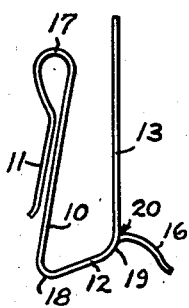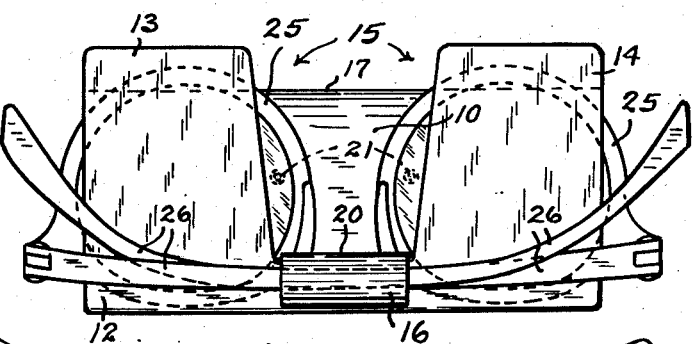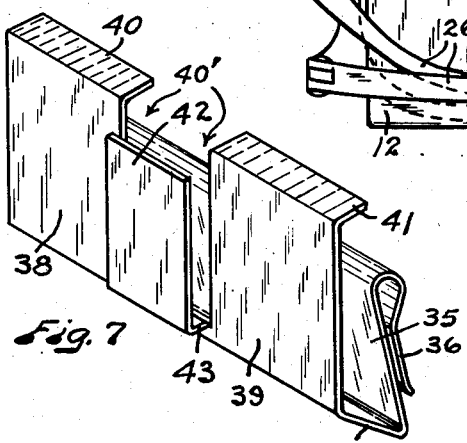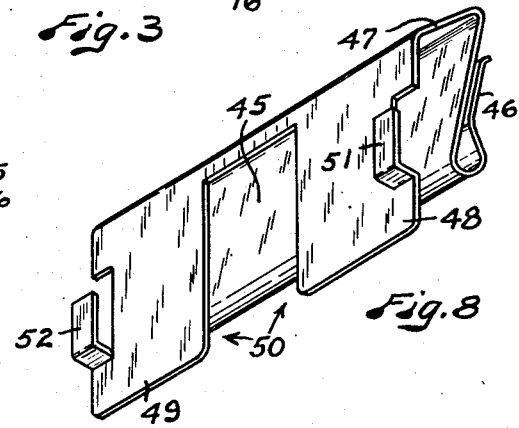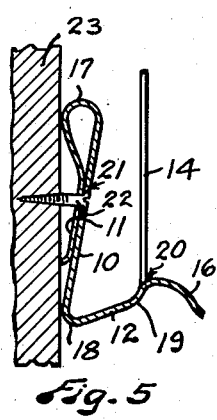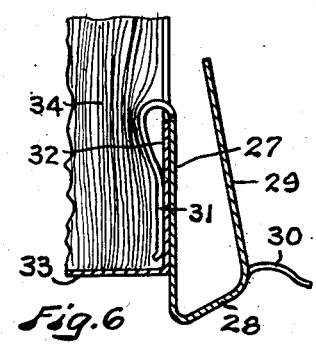

2,826,387
Patented Mar. 11, 1958

2,826,387

HOLDER FOR GLASSES

Edward N. Rutten, Seattle, Wash.

Application November 2, 1953, Serial No. 389,748

2 Claims. (Cl. 248—229)

This invention relates to a glasses or spectacle holder and an object of this invention is to provide a simple, efficient and convenient glasses holder which is neat and attractive in appearance and which will protect glasses which are placed therein.

Another object is to provide a glasses holder which is well adapted to be attached to a movable support, such as the visor of a motor vehicle windshield to receive and hold sun glasses or similar glasses used by persons in the vehicle, the holder providing a convenient and safe receptacle for glasses which are put on and taken off at frequent intervals and providing means for taking care of the glasses in such a manner that they are always readily available and can be put in or taken out of the holder by the use of only one hand leaving the other hand free for steering the vehicle or for other uses.

Another object of the invention is to provide a glasses holder which is well adapted for use in barber shops and functions as a safe and convenient receptacle for glasses removed by a barber from a customer when the customer gets into a chair and which must be replaced on the customer or returned to him when he is ready to leave the shop.

Another object is to provide a glasses holder which is readily accessible for the insertion or removal of glasses irrespective of the angular position into which it is turned and which will hold the glasses firmly and safely when it is right side up or horizontal or inverted or positioned at any other angle.

Other objects of the invention will be apparent from the following description taken in connection with the accompanying drawings.

Figure 1 is a perspective view of a glasses holder constructed in accordance with this invention showing the same in an upright position and free from supporting means.

Fig. 2 is an end elevation of said glasses holder.

Fig. 3 is a front elevation of this glasses holder showing a pair of glasses therein, the holder being shown in an upright position.

Fig. 4 is a sectional view of this glasses holder showing the same attached to a movable support, such as a windshield visor and showing the holder in an inverted or up side down position with a pair of glasses in the holder.

Fig. 5 is a sectional view showing the holder as it may appear when attached to a wall or like support.

Fig. 6 is another sectional view showing a holder having a spring clip of modified form and showing this spring clip engaged with a tissue paper dispenser of a form commonly used in barber shops.

Fig. 7 is a perspective view showing a glasses holder of modified form.

Fig. 8 is a perspective view showing a glasses holder of still a different modified form.

Like reference numerals designate like parts throughout the several views.

The glasses holder disclosed in Figs. 1 to 5 is constructed of a single piece of thin flat somewhat resilient material capable of being bent or otherwise formed into the shape shown. This holder comprises a flat back wall 10, a spring clip 11, a flat inclined bottom wall 12, a front wall composed of two front plates 13 and 14 which are spaced apart longitudinally of the holder and have an access notch or slot or opening 15 of substantial width therebetween, and a forwardly extending downwardly curved bow engaging member 16. A resilient loop portion 17 connects the spring clip 11 with the edge of the back wall 10 which is shown uppermost in Figs. 1, 2 and 3. The major portion of the spring clip 11 normally lies close to and approximately parallel to the back plate or wall 10. The spring clip 11 shown in Figs. 1 to 5 extends from end to end of the holder but obviously this spring clip may be made shorter if desired, as hereinafter explained in connection with Fig. 6. The edge of the back wall 10 shown at the bottom of Figs. 1, 2 and 3 is connected by a bend 18 with one edge of the bottom wall 12. Another bend 19 connects the other or forward edge of the bottom wall 12 with the two front plates 13 and 14. The front plates 13 and 14 are positioned in a common plane and are spaced apart edgewise to provide the relatively wide access opening or notch or slot 15 therebetween. The bow engaging member 16 is positioned at the bottom of the access opening 15 and is united by a bent portion 20 with the bottom wall 12. The bow engaging member 16 extends outwardly from the common plane of the front plates 13 and 14 and is curved downwardly as respects the showing in Figs. 1, 2 and 3.

Preferably the bottom wall 12 is positioned at an acute angle of less than ninety degrees relative to the back plate or wall 10 and at an obtuse angle of more than ninety degrees relative to the plane of the front plates. When the bottom is thus positioned at an incline relative to the front and back of the holder the glasses fit within the bend 18 and rest against the front plates 13 and 14, as shown in Fig. 4, and the space within the holder is utilized to better advantage than it would be if the bottom wall 12 were substantially at right angles to the back plate 10.

Preferably the back plate or wall 10 and spring clip 11 are provided with aligned holes 21 for the reception of screws 22, see Figs. 1 and 5, by which the holder may be permanently secured to a wall 23 or any like support. The holes 21 in the back wall 10 may be countersunk to receive the heads of the screws 22. The holder is a convenience when installed in a bath room in the manner shown in Fig. 5.

This holder may be supported by engaging the spring clip 11 with any suitable object, such as a windshield visor 24 of a motor vehicle, see Fig. 4. Windshield visors of this type are ordinarily angularly adjustable in various different ways and this holder is constructed so that it can be turned into substantially any angular position by adjustment of the visor and still hold the glasses firmly and securely and be readily accessible for insertion and removal of the glasses by the use of only one hand. Fig. 5 shows the holder in an inverted position.

In placing glasses 25, Fig. 3, in this holder the glasses are inverted and placed between the back plate 10 and front plates 13 and 14 and the bows 26 of the glasses are positioned outside of the front plates 13 and 14 and engaged under the bow retaining member 16. The access opening or slot 15 permits the glasses to be held in one hand and quickly and easily placed in or removed from the holder leaving the other hand free for other uses. When the bows are engaged under the bow engaging member, as shown in Fig. 3, the glasses will be securely retained in the holder and the bows will be held close to the holder and can not swing outwardly relative to the holder irrespective of the angle at which the holder is turned. The holder is thus particularly well adapted for use on a windshield visor to receive and hold sun glasses, the glasses being well protected and being held firmly and securely and being readily accessible irrespective of the angular position into which the visor is adjusted.

When the holder is installed in an upright position on a fixed support, as illustrated in Fig. 5, it is not essential to engage the bows under the bow holding member 16 as the glasses will be held in a fairly safe and satisfactory manner irrespective of their position in the holder.

The holder shown in Figs. 1 to 5 may also be used by placing it in an upright position on a desk or table and laying the glasses in the holder when they are not in use. When so used the bend 18 and the tip of the bow retaining member 16 will rest on the table and support the holder upright.

Fig. 6 shows a glasses holder having a back plate 27, bottom wall 28, front plates, one of which, namely front plate 29 is shown and bow engaging member 30, which are the same as the respective parts 10, 12, 13 and 16 shown in Figs. 1 to 5 inclusive. A spring clip 31 of the Fig. 6 holder is shorter than the spring clip 11 shown in Figs. 1 to 5 to adapt it to be engaged with the front side of a tissue paper dispenser 33, the spring clip 31 hooking over a wall 32 of said dispenser. The dispenser 33 is of a well known form commonly employed to dispense tissue paper 34 used as neck strips in a barber shop. This glasses holder, when used in the manner illustrated in Fig. 6, is a great convenience in taking care of glasses belonging to patrons of the shop. When a patron gets into a barber's chair with his glasses on the barber can remove the glasses and place them in this holder where the glasses are safely held and protected from accidental damage or breakage such as may occur if the glasses are laid on a shelf or table.

Fig. 7 shows a glasses holder having a back wall 35, spring clip 36, bottom wall 37 and two front plates 38 and 39 with an access opening 40' between them. The parts 35 to 39 inclusive and 40' are similar to the respective previously described parts 10 to 15 inclusive of Figs. 1 to 5. The holder of Fig. 7 differs from the holder of Figs. 1 to 5 in that the front plates 38 and 39 have short integral retaining lugs 40 and 41 respectively on their upper ends. The lugs 40 and 41 extend substantially at right angles to the plates 38 and 39 at a substantial distance above the top of the back wall 35 and toward the plane of the back wall 35 and over the glasses receiving compartment of the holder. When glasses are within the holder these lugs 40 and 41 will overhang the glasses and prevent them from dropping out of the holder or from being jarred or shaken out of the holder by vibration irrespective of the position of the holder. The holder shown in Fig. 7 further differs from the holder shown in Figs. 1 to 5 in that it has a medially disposed bow engaging member 42 in the form of a flat plate positioned outwardly from the plane of the front plates 38 and 39 and connected with the holder by an offset shelf portion 43. When glasses are placed in the holder shown in Fig. 7 the bows of said glasses are positioned between the bow engaging plate 42 and the front plates 38 and 39 and the plate 42 holds said bows close to the front plates 38 and 39 and prevents them from swinging outwardly regardless of the angular position into which the holder is moved.

Fig. 8 is an inverted perspective view showing a glasses holder having bow retaining means of a different form from the bow retaining means shown in Figs. 1 to 5 inclusive. The holder shown in Fig. 8 has a back wall 45, spring clip 46, bottom wall 47, front plates 48 and 49, and an access opening 50. The parts 45 to 50 inclusive are similar to the parts 10 to 15 inclusive respectively of Figs. 1 to 5. The bow retaining means shown in Fig. 8 is in the form of two bow receiving L-shaped clips 51 and 52 struck or punched from the outer edge portions of the front plates 48 and 49 and extending toward the bottom 47 of the holder. When glasses are placed in this holder shown in Fig. 8 the bows are engaged under the clips 51 and 52 and will be held by these clips close to the front plates 48 and 49 and the clips 51 and 52 will prevent the glasses from dropping out of the holder and hold the bows close to the front plates 48 and 49.

The material of which these holders are made is resilient so that the front plates of the holders may be easily sprung outwardly a short distance to facilitate inserting the glasses in the holders. This resiliency is particularly advantageous in the structure shown in Fig. 7 in which the glasses must be inserted under the overhanging lugs 40 and 41.

The foregoing description and accompanying drawings clearly disclose preferred embodiments of this invention but it will be understood that this disclosure is merely illustrative and that changes may be made within the scope and spirit of the following claims.

I claim:

1. A glasses holder comprising a generally rectangular back plate; a spring clip substantially parallel to said back plate and positioned adjacent the outer side of said back plate and connected by a spring loop with the upper edge of said back plate; a bottom wall connected with the lower edge of said back plate and extending forwardly therefrom; two front plates connected with the forward edge of said bottom wall and extending upwardly therefrom in the same general direction as said back plate and spaced from said back plate, said two front plates being spaced apart longitudinally of the holder and providing therebetween substantially midway of the length of the holder a relatively wide access opening between the adjacent edges of said front plates; and a downwardly curved bow engaging member extending outwardly from the front side of the holder at the bottom of said access opening retaining glasses within the holder irrespective of the position of the holder when the bows of the glasses are engaged thereunder.

2. A glasses holder comprising a generally rectanguular back plate; a spring clip substantially parallel to said back plate and positioned adjacent one side of said back plate and connected by a spring loop with one edge of said back plate; a bottom wall connected with the other edge of said back plate and extending outwardly therefrom at an acute angle relative to said back plate and on the opposite side of the plane of the back plate from the spring clip; two spaced apart front plates connected with the edge of said bottom wall opposite said back plate and extending away from said bottom wall in the same general direction as said back plate and spaced from said back plate but slightly inclined toward said back plate, said two front plates being spaced apart longitudinally of the holder to leave between said two front plates and substantially midway of the length of the holder an access opening extending from the top of the holder downwardly; and a downwardly curved outwardly extending bow engaging member rigid with the front of the holder at the location of the bottom of said access opening.

References Cited in the file of this patent

UNITED STATES PATENTS

| 547,470 | Zestermann | Oct. 8, 1895 |
| 942,366 | Deeter | Dec. 7, 1909 |
| 1,219,685 | Wall | Mar. 20, 1917 |
| 1,549,142 | McKenzie | Aug. 11, 1925 |
| 2,411,361 | Bongiovanni | Nov. 19, 1946 |
| 2,448,137 | Cody | Aug. 31, 1948 |
| 2,545,599 | Bartlett | Mar. 20, 1951 |
| 2,623,722 | Glunt et al. | Dec. 30, 1952 |
| 2,637,128 | Weeks | May 5, 1953 |

FOREIGN PATENTS

| 448,022 | Great Britain | of 1935 |